Patented Sept. 8, 1953

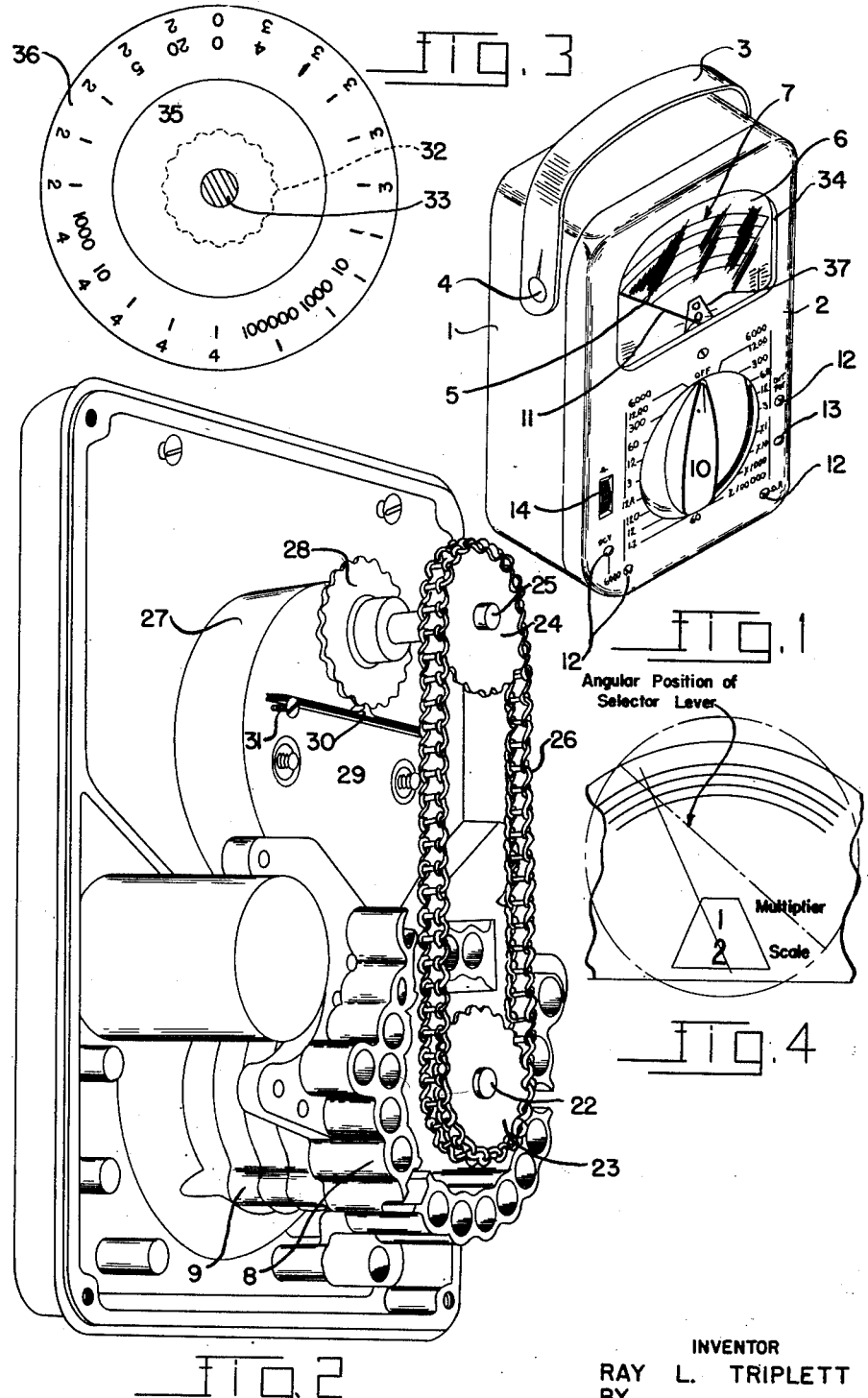

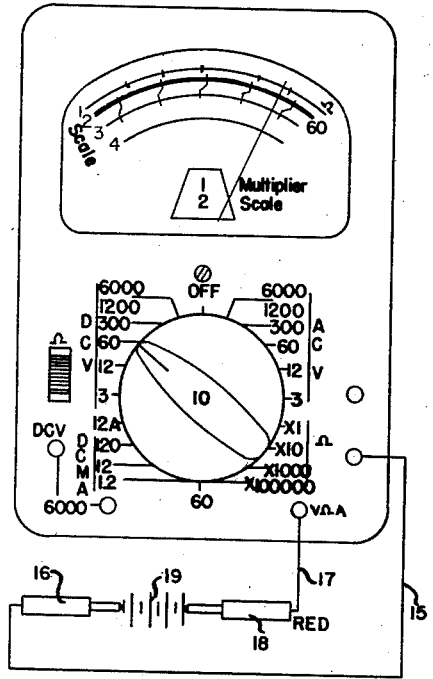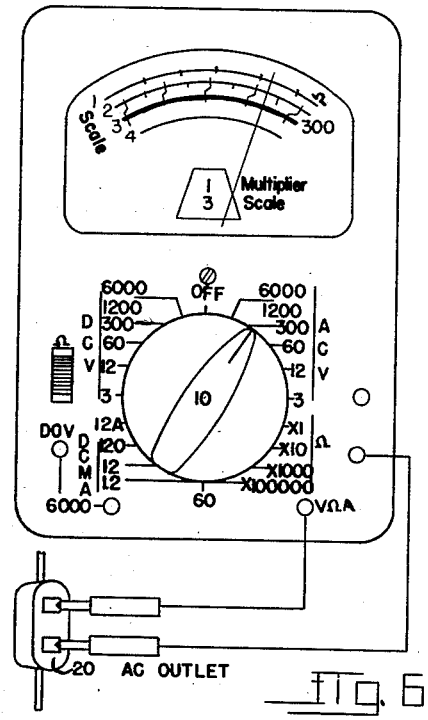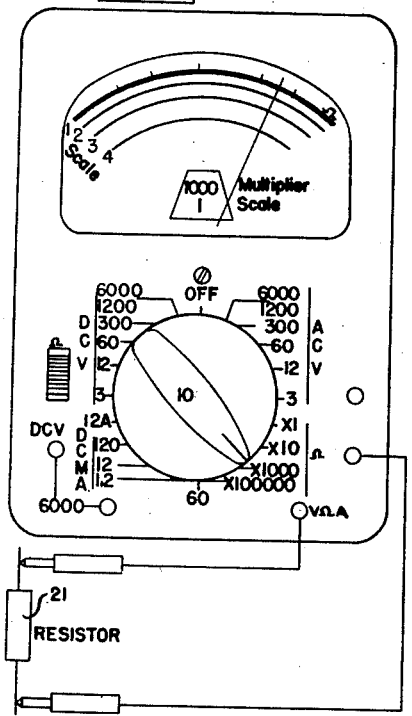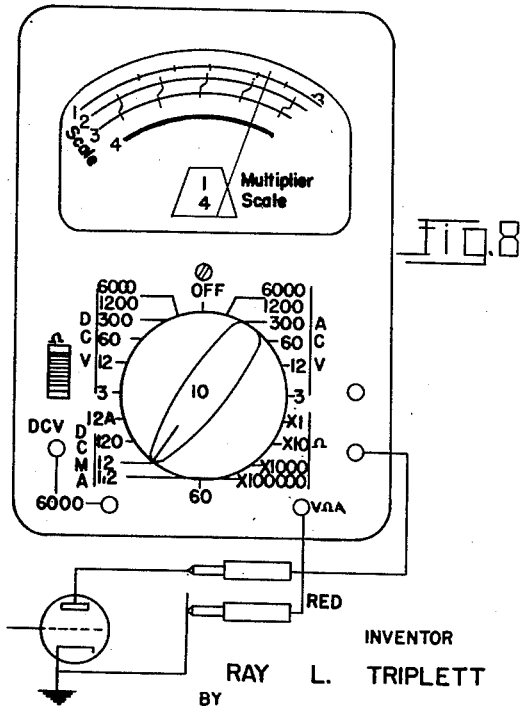

2,651,755

UNITED STATES PATENT OFFICE 2,651,755

ELECTRICAL MEASURING INSTRUMENT WITH RANGE AND MULTIPLYING FACTOR INDICATOR

Ray L. Triplett, Bluffton, Ohio, assignor to The Triplett Electrical Instrument Company, Bluffton, Ohio, a corporation of Ohio Application April 12, 1950, Serial No. 155,400

3 Claims. (Cl. 324—115)

The present invention relates to electrical measuring devices, especially to multi-purpose instruments having a plurality of scales and a single pointer.

Devices of this character are used for many purposes such as voltmeter, ammeter, ohmmeter, capacity meter and a so-called "output volt" (decibels) meter which require a number of scales cooperating with a single pointer and a selecting switch for adapting the actuating element to the various measuring uses and values. These scales are concentrically arranged around the axis of the pointer and positioned relatively close together, all of which factors tend to cause error in picking the proper scale, particularly when readings must be made quickly.

This inaccuracy is even more enhanced when various multiplier factors must be taken into consideration, which in the case of a multi-purpose, multi-range instrument may involve many such factors.

The primary object of the invention is to provide an electrical measuring instrument having a plurality of scales and a single pointer controlled by a multi-purpose switch, with provision for indicating the proper scale to be used for a given position of the switch.

Another object is to provide an electrical measuring instrument having a multi-purpose switch and a plurality of scales with increased range brought about by multiplying factors in which provision is made for selecting each scale and the proper multiplying factor for each position of the switch.

Still another object is to provide a device of the type mentioned, in which the indicia showing the multiplying factor and proper scale to be used are within ready view of the operator and this indicia is mechanically related to the switch such that there is not the slightest chance of indicating the wrong factor or scale for a given position of the selecting switch.

A further object is to provide a multi-purpose instrument which can be used for indicating volts, amperes, (milliamperes), ohms, capacities and "output volts" on preselected scales traversed by a single pointer which is controlled by a circuit-selecting switch.

The final object is to provide an instrument of the character referred to in the immediately foregoing object, in which not only the scale is pre-selected for a given position of the switch but also the multiplying factor corresponding to the scale being used is indicated in order that the readings can be greatly facilitated and translated with accuracy.

Other objects and features will be apparent as the following specification is perused in connection with the accompanying drawings, in which:

Figure 1 represents a perspective view of an electrical measuring instrument improved in accordance with the principles of the present invention;

Figure 2 is an enlarged perspective view looking toward the rear of the instrument with the cover or casing removed;

Figure 3 shows a typical circular sub-dial that may be used with a typical improved instrument, the dial being rotated when the multi-purpose switch is operated;

Figure 4 represents a phantom plan view showing a typical relationship between the position of the circuit-selecting switch and the corresponding multiplier and scale indicia carried on the sub-dial; and Figures 5 to 8 illustrate different positions of the switch to adapt the instrument to the various electrical values and functions and indicating the movement of the dial in accordance with the rotation of the switch in identifying the respective scales and multiplying factors to be used.

Referring to the drawings more in detail, Fig. 1 illustrates a multi-purpose electrical instrument which may comprise a casing consisting of a box-like part 1, made of any suitable insulating material, provided with a front panel 2 secured to the casing by any suitable means such as screws. There is preferably provided a strap handle 3 held to the casing by pins 4.

As mentioned, the instrument is of the multi-purpose type, and to this end may be provided with a plurality of scales for reading A. C. or D. C. milliamperes, or for measuring ohms. For giving the instrument wide utility, each of the aforesaid clasifications is divided into a plurality of ranges. For example, the voltmeter scales may read up to 3 volts, 12 volts, 60 volts, 300 volts, 1200 volts and even to 6,000 volts, respectively, for both A. C. and D. C. The current scale of the instrument may provide for ranges of from 0 to 60 microamperes to 1.2 milliamperes, to 12 milliamperes, to 120 milliamperes and to 12 amperes.

The instrument may also include an ohmmeter and for this purpose there is a scale for indicating ohms, and the instrument includes means providing for multipliers of 1, 10, 1,000 and 100,000 to extend the range of the scale.

To provide for accuracy and ease of reading, there is for each of the aforementioned uses and ranges a different set of circuit elements in order to give the meter movement substantially full scale deflection for the maximum reading to be taken within that range. The indicating meter in the instrument is generally indicated at 5 in Fig. 1, and the dial 6 therefor having a plurality of scales associated with the above mentioned ranges is generally indicated at 7 in the said figure.

The switch mechanism for switching from one set of circuit elements to another is indicated at 8 in Fig. 2 and comprises a construction which is more fully illustrated and described in the copending applications Serial Nos. 5217 and 57,553 filed in the name of George H. Klay on January 30, 1948, and October 30, 1948, respectively, and assigned to the same assignee as the present application.

In general, this switch comprises a plurality of banks of terminals or contact members (not shown) which are retained between substantially cylindrical blocks of insulating material 9. Within the blocks there are rotors (not shown) and these are adapted for rotation by means of the blade of the indexing mechanism which includes the handle 10. The rotors have contact fingers (not shown) that ride on the contact rings and thus are always in contact with the rings. The rotors also include the contact fingers which move from one to the other of the associated terminals as the switch is indexed from position to position.

It will be apparent that the switch mechanism provides for the selective connection of the contact rings with a plurality of the terminals. The latter, in turn, are connected externally of the switch mechanism with the aforementioned circuit elements comprising resistors, condensers and batteries. Thus, by rotating the switch handle 10 to any one of its twenty positions, including the off position, connections are made and broken within the circuit to the various resistors, condensers and batteries, and thus control the voltage applied to the actuating member (not shown) which operates the single pointer 11.

It will be seen in Fig. 1 that there are a plurality of apertures 12 opening from the front side of the panel 2 and these apertures are jack openings for receiving the jack ends of leads which are to be connected with a circuit to be measured. The electrical connections between the jacks in these openings and the various resistors, condensers and batteries within the casing are conventional and it need only be pointed out that the negative terminal of the indicating instrument 6 is directly connected with the jack 13 which is known as the "common" jack. The negative terminal of the indicating instrument is also connected through the zero adjusting resistor 14 with a bank of interconnected terminals which lie in the portion of the selector switch that is utilized when resistances are being measured.

The positive side of the instrument 6 or actuator for that instrument is also connected in a conventional manner through the contacts of the selector switch to rectifiers and batteries and to predetermined resistances and condensers as is well understood in the art.

The uses of this instrument are typically illustrated in Figs. 5 to 8 inclusive and an exemplary position of the switch handle 10 within each of the various ranges of values corresponding to such uses has been shown thereon. The scales of the instrument have been numbered 1 to 4 inclusive for convenience, although it will be understood that there may be as many scales as there are different uses for the instrument, indeed, any one of these scales may serve a double use depending on the manner in which the contact plugs are inserted into the various openings of the panel.

Thus in Fig. 5 a lead 15 taken from the "common" plug is carried to a contact electrode 16. A corresponding conductor 17 is taken from a plug inserted into the lowermost right-hand aperture 12 and terminates in an electrode 18. These electrodes contact opposite sides of a battery 19 to have the voltage indicated by the pointer 11. It will be noted that the handle 10 has been indexed to the position 60 on the D. C. voltage range and the scale 2 in Fig. 5, having a maximum range of 60, will indicate directly the voltage of the battery.

In Fig. 6 the A. C. voltage across a typical outlet 20 is being measured and for this purpose the handle 10 is moved to the A. C. voltage range on the panel. The voltage in this case is read off on scale 3 which has been shown darker than the remaining scales in order to facilitate the explanation.

In Fig. 7 the ohms value of a resistor 21 is being measured and the handle 10 has been indexed to the lower right-hand range of values, the reading of the ohmage being taken from scale 1 and multiplied by the factor of 1,000 in the typical example shown.

Fig. 8 depicts the manner in which the current in milliamperes can be measured between the cathode and anode of a thermionic device. For this purpose the handle 10 has been indexed to the milliampere range and the reading is taken from scale 4 which has been darkened for emphasis.

While I have shown the meter being used for measuring D. C. and A. C. voltage, also for measuring ohms and milliamperes, it will be understood that this multi-purpose meter can be additionally used for any and all purposes for which meters of this kind are normally employed. For example the meter, when provided with a decibel scale (not shown) and a connection is taken from the uppermost right-hand opening 12 of the meter, together with a lead from the common opening 13, the output of a radio set can be measured in decibels. The connections within the meter are such that the handle would be turned to the A. C. voltage range on the panel, similar to that shown in Fig. 6. Finally, the meter could be used for measuring the capacity of an unknown capacitor when the suitable and well known connections are made and the handle 10 is indexed to the A. C. voltage range. The reading may be taken from scale 3.

In making these determinations, certain multiplying factors are involved depending on the maximum readings of the respective scales and the indexed position of the handle 10. Whereas heretofore these multiplying factors have been obtained from manufacturers' charts accompanying the instrument, in accordance with one of the features of my invention the multiplier is shown directly on the scale for each and every individual position of the handle. It will be further noted that in these multi-use instruments that involve many scales, for example four as indicated, but as high as six or eight scales, it is often difficult, and certainly inconvenient, to determine which of these many scales must be referred to in determining the proper value of the voltage, amperage, ohmage, capacitance or decibel output being measured.

In accordance with another feature of my invention, the particular scale is instantly identified from the indexed position of the handle so that both the multiplier as well as the scale are known immediately upon making the reading and all cause for inaccuracy is eliminated.

In accordance with my invention, the shaft 22 (Fig. 2) of the selector switch on which the handle 10 is mounted is carried to the rear of the switch and fitted with a sprocket wheel 23. Directly above this wheel there is a corresponding wheel 24 mounted on a shaft 25 and a chain 26 spans the two wheels. The shaft 25 is journaled within a gear case 27 and there is a detent wheel 28 secured to the shaft exterior to the case. This wheel cooperates with a projection 29 on a leaf spring member 30 spanning a pair of screws 31. The purpose of the wheel and the projection is to assure an accurate indexing movement of the wheel and shaft 25 in response to a similar movement of the shaft 22 when the handle 10 is rotated to the various measuring ranges.

Within the case 27 there is a series of intermeshing gears (not shown) which drive a gear 32 journaled on a shaft 33 (Fig. 3). The shaft 33 is located approximately midway between the vertical edges of the window 34 of the instrument and directly below the position of the scales. A disc 35 (Fig. 3) is mounted on the shaft and this disc carries an annular paper ring 36 on which the various typical numbers shown in this figure have been printed. Thus the disc 35 and the numbered ring 36 constitute a sub-dial below the main dial 5 of the instrument. At a position adjacent the lowermost position of the sub-dial there is a window 37, triangularly shaped for convenience, cut through the main dial 5 in order to expose each pair of superposed numbers as the sub-dial 35 is rotated or indexed.

The numbers on the sub-dial have been predetermined according to the various uses in which the instrument is to be employed and the inner circular group of numbers constitutes multiplying factors, while the outer circular group represents one of the four scales shown in Figs. 5 to 8 inclusive. The sub-dial 35 carrying these numerical charts is so arranged on the shaft 33 that when the handle 10 is in the vertical or off position, as shown in Fig. 1, the numerals 0
0 appear at the window 37. It will be then noted that as the switch 10 is moved within the various voltage, current and ohm ranges, different scales and multipliers will be shown at the window as the sub-dial 35 is indexed in synchronism with the indexing operation of the handle 10.

Fig. 4 shows a typical example in which the handle 10 has been moved, for example, to the D. C. voltage position 60 as indicated by the dot-dash line. Under these circumstances the numerals 1
2 will appear at the window, in which case the 1 will constitute the multiplier and the 2 will represent the fact that the readings are to be taken from scale No. 2 as indicated on the face of the main dial plate.

From the foregoing it is evident that I have disclosed an improved electrical measuring instrument for multi-purposes in which as the handle 10 is indexed throughout the various voltage, current and resistance ranges, in accordance with the marked values given on the face of the instrument at the position of the switch, indicia is automatically furnished through a window in the main dial plate where it can be best seen as to the number of the scale on which the reading must be made, and also as to the multiplying factor that must be used in order to translate the reading into a true value. There is no further need for any reference to charts separate from the instrument as the instrument is self-contained to the extent that all the necessary information and the true values can be obtained from the instrument itself. There is no longer any excuse for reading the values on the wrong scale or of using incorrect multipliers as all of these factors are automatically accommodated within the instrument itself in the manner shown and described.

It will be understood that various modifications and arrangements in structure could be made without departing from the spirit of my invention, and, accordingly, I desire to comprehend such modifications and substitutions of equivalents as may be considered to come within the scope of the appended claims.

Having thus fully described my invention, what I claim as new and desire to secure by Letters Patent, is:

1. A multi-range, multi-use electrical measuring instrument comprising a casing provided with a dial and a plurality of scales, a single pointer traversing the scales, and an electrically operated actuator for said pointer, electrical elements including circuits within the casing, a circuit selecting switch for connecting and disconnecting said actuator and elements, said scales having measurement ranges which require multiplying factors to obtain the true reading from the pointer, and means for indicating on said dial, in response to operation of said switch, the proper single scale to be read and the proper multiplying factor to be applied to the readings of the pointer in order to adapt the instrument to said multi-ranges of measurement and to said multi-uses.

2. A multi-range, multi-use electrical measuring instrument comprising a casing provided with a dial and a plurality of stationary scales, a single pointer traversing the scales, and an electrical actuator for said pointer, electrical elements including circuits within the casing, a rotary selector switch and circuits therefor for connecting said actuator and elements in a predetermined manner, a plurality of ranges of electrical values on said casing indicating the selection of said circuits by said switch, each of said ranges corresponding to one of said scales on the dial and requiring multiplying factors for that scale, and means including a rotary indicating device operated in synchronism with the rotary movement of said switch for showing at a glance the proper scale to be read and the proper multiplying factor to be applied for a given range position of said switch.

3. A multi-range, multi-use electrical measuring instrument comprising a casing provided with a main dial and a plurality of scales, a single pointer traversing the scales, and an electrically operated actuator for said pointer, electrical elements including circuits within the casing, a rotary selector switch for connecting and disconnecting the circuits to said electrical elements and actuator in a predetermined manner, means including a rotary sub-dial having multiplying factors and scale designations thereon for indicating the specific multiplier to be used and the scale on which the readings are to be read in response to the rotation of said switch within the respective ranges of electrical values, the indications on said sub-dial being shown through a window on the main dial of the instrument and means whereby the rotation of the selector switch rotates said sub-dial.

RAY L. TRIPLETT.

References Cited in the file of this patent

UNITED STATES PATENTS

| Number | Name | Date |
|---|---|---|
| 2,101,296 | Simpson et al. | Dec. 7, 1937 |
| 2,182,572 | Schnell | Dec. 5, 1939 |
| 2,400,190 | Clark | May 14, 1946 |
| 2,466,558 | Sadlon | Apr. 5, 1949 |

FOREIGN PATENTS

| Number | Country | Date |
|---|---|---|
| 216,713 | Switzerland | Dec. 16, 1941 |
| 608,189 | Great Britain | Sept. 10, 1948 |